(12) United States Patent
Liu et al.

(10) Patent No.: US 8,457,416 B2
(45) Date of Patent: Jun. 4, 2013

(54) ESTIMATING WORD CORRELATIONS FROM IMAGES

(75) Inventors: Jing Liu, Beijing (CN); Bin Wang, Beijing (CN); Zhiwei Li, Beijing (CN); Mingjing Li, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 11/956,333

(22) Filed: Dec. 13, 2007

(65) Prior Publication Data

US 2009/0074306 A1 Mar. 19, 2009

Related U.S. Application Data

(60) Provisional application No. 60/972,167, filed on Sep. 13, 2007.

(51) Int. Cl.
*G06K 9/72* (2006.01)

(52) U.S. Cl.
USPC .............. 382/229; 707/999.004; 707/999.107

(58) Field of Classification Search
USPC ........................................................ 382/229
See application file for complete search history.

(56) References Cited

U.S. PATENT DOCUMENTS

| | | | |
|---|---|---|---|
| 5,630,121 A * | 5/1997 | Braden-Harder et al. | 1/1 |
| 5,680,636 A | 10/1997 | Levine et al. | |
| 5,852,823 A | 12/1998 | De Bonet | |
| 5,987,457 A * | 11/1999 | Ballard | 1/1 |
| 6,272,484 B1 | 8/2001 | Martin et al. | |
| 6,397,181 B1 | 5/2002 | Li et al. | |
| 6,415,282 B1 | 7/2002 | Mukherjea et al. | |
| 6,687,416 B2 | 2/2004 | Wang | |
| 6,850,644 B1 | 2/2005 | Shin et al. | |
| 6,970,860 B1 | 11/2005 | Liu et al. | |
| 7,028,253 B1 | 4/2006 | Lieberman et al. | |
| 7,043,094 B2 | 5/2006 | Thomas et al. | |
| 7,099,860 B1 * | 8/2006 | Liu et al. | 1/1 |
| 7,162,691 B1 | 1/2007 | Chatterjee et al. | |
| 7,209,815 B2 | 4/2007 | Grier et al. | |
| 7,231,381 B2 | 6/2007 | Li et al. | |
| 7,234,106 B2 | 6/2007 | Simske | |

(Continued)

FOREIGN PATENT DOCUMENTS

WO WO02099697 A1 12/2002

OTHER PUBLICATIONS

PCT Search Report for PCT Application No. PCT/US2008/075525, mailed Jan. 9, 2009 (11 pages).

(Continued)

*Primary Examiner* — David Zarka
(74) *Attorney, Agent, or Firm* — Lee & Hayes, PLLC

(57) ABSTRACT

Word correlations are estimated using a content-based method, which uses visual features of image representations of the words. The image representations of the subject words may be generated by retrieving images from data sources (such as the Internet) using image search with the subject words as query words. One aspect of the techniques is based on calculating the visual distance or visual similarity between the sets of retrieved images corresponding to each query word. The other is based on calculating the visual consistence among the set of the retrieved images corresponding to a conjunctive query word. The combination of the content-based method and a text-based method may produce even better result.

21 Claims, 5 Drawing Sheets

U.S. PATENT DOCUMENTS

| | | | |
|---|---|---|---|
| 7,283,992 | B2 | 10/2007 | Liu et al. |
| 2003/0110181 | A1 | 6/2003 | Schuetze et al. |
| 2003/0123737 | A1 | 7/2003 | Mojsilovic et al. |
| 2004/0049734 | A1 | 3/2004 | Simske |
| 2004/0205545 | A1 | 10/2004 | Bargeron et al. |
| 2004/0225686 | A1 | 11/2004 | Li et al. |
| 2004/0267733 | A1 | 12/2004 | Kim |
| 2005/0004910 | A1 | 1/2005 | Trepess |
| 2005/0055344 | A1 | 3/2005 | Liu et al. |
| 2005/0071365 | A1 | 3/2005 | Hou et al. |
| 2005/0131951 | A1 | 6/2005 | Zhang et al. |
| 2005/0165763 | A1 | 7/2005 | Li et al. |
| 2005/0228825 | A1 | 10/2005 | Yang |
| 2005/0235272 | A1 | 10/2005 | Skinner |
| 2006/0020597 | A1 | 1/2006 | Keating et al. |
| 2006/0041564 | A1 | 2/2006 | Jain et al. |
| 2006/0061595 | A1 | 3/2006 | Goede et al. |
| 2006/0155684 | A1 | 7/2006 | Liu et al. |
| 2006/0161520 | A1 | 7/2006 | Brewer et al. |
| 2006/0173909 | A1 | 8/2006 | Carlson et al. |
| 2006/0195858 | A1 | 8/2006 | Takahashi et al. |
| 2006/0206475 | A1 | 9/2006 | Naam et al. |
| 2007/0005571 | A1 | 1/2007 | Brewer et al. |
| 2007/0052734 | A1 | 3/2007 | Skinner et al. |
| 2007/0067345 | A1* | 3/2007 | Li et al. ..................... 707/104.1 |
| 2007/0133947 | A1 | 6/2007 | Armitage et al. |
| 2007/0174269 | A1 | 7/2007 | Jing et al. |
| 2007/0174320 | A1 | 7/2007 | Chou |
| 2007/0214114 | A1* | 9/2007 | Liu et al. ............................ 707/3 |
| 2007/0239778 | A1* | 10/2007 | Gallagher ................... 707/104.1 |
| 2007/0276820 | A1* | 11/2007 | Iqbal ................................ 707/4 |
| 2008/0071744 | A1 | 3/2008 | Yom-Tov |
| 2008/0267503 | A1 | 10/2008 | Denoue et al. |
| 2009/0094234 | A1 | 4/2009 | Marvit et al. |
| 2010/0114888 | A1 | 5/2010 | van Zwol et al. |
| 2010/0114908 | A1 | 5/2010 | Chand et al. |

OTHER PUBLICATIONS

Barnard, et al., "Matching Words and Pictures", retrieved at <<http://jmlr.csail.mit.edu/papers/volume3/barnard03a/barnard03a.pdf>>, Journal of Machine Learning Research, 2003, pp. 1107-1135.

Cascia, et al., "Combining Textual and Visual Cues for Content-based Image Retrieval on the World Wide Web", retrieved at <<http://www.cs.bu.edu/techreports/pdf/1998-004-combining-text-and-vis-cues.pdf>>, IEEE, BU CS TR98-004, Jun. 1998, 5 pgs.

Flickner, et al., "Query by Image and Video Content: The QBIC System", at <<http://www.cs.virginia.edu/~son/cs662.s06/QBIC.pdf>>, IEEE, Sep. 1995, pp. 23-32.

Guo, et al., "Enhanced Max Margin Learning on Multimodal Data Mining in a Multimedia Database", retrieved at <<http://delivery.acm.org/10.1145/1290000/1281231/p340-guo.pdf?key1=1281231&key2=0098944911&coll=GUIDE&dl=&CFID=15151515&CFTOKEN=6184618>>, ACM, KDD'07, Aug. 12-15, 2007, pp. 340-349.

Inoue, "On the Need for Annotation-Based Image Retrieval", available at least as early as Nov 7, 2007, at <<http://research.nii.ac.jp/~m-inoue/paper/inoue04irix.pdf>>, National Institute of Informatics, Tokyo, Japan, 3 pgs.

Jeon, et al., "Automatic Image Annotation and Retrieval using Cross-Media Relevance Models", at <<http://ciir.cs.umass.edu/pubfiles/mm-41.pdf>>, ACM, SIGIR'03, Jul. 28-Aug. 1, 2003, 8 pgs.

Jin, et al., "Effective Automatic Image Annotation via a Coherent Language Model and Active Learning", available at least as early as Jun. 12, 2007, at <<http://delivery.acm.org/10.1145/1030000/1027732/p892-jin.pdf?key1=1027732&key2=2189361811&coll=GUIDE&dl=GUIDE&Cfid=21118987&CFTOKEN=73358540>>, ACM, MM'04, Oct. 10-16, 2004, pp. 892-899.

Kang, et al., "Regularizing Translation Models for Better Automatic Image Annotation", available at least as early as Jun. 12, 2007, at <<http://delivery.acm.org/10.1145/1040000/1031242/p350-kang.pdf?key1=1031242&key2=0070461811&coll=GUIDE&dl=GUIDE&CFID=21120579&CFTOKEN=59010486>>, ACM, CIKM'04, Nov. 8-13, 2004, pp. 350-359.

Li, et al., "Image Annotation by Large-Scale Content-based Image Retrieval", at <<http://delivery.acm.org/10.1145/1190000/1180764/p607-li.pdf?key1=1180764&key2=0704643811&coll=GUIDE&dl=GUIDE&CFID=22942426&CFTOKEN=26272205>>, ACM, MM'06, Oct. 23-27, 2006, pp. 607-610.

Li, et al., "Statistical Correlation Analysis in Image Retrieval", available at least as early as Jul. 4, 2007, at <<http://research.microsoft.com/~zhengc/papers/PR02li.pdf>>, 12 pgs.

Liu, et al., "An Adaptive Graph Model for Automatic Image Annotation", available at least as early as Jun. 12, 2007, at <<http://delivery.acm.org/10.1145/1180000/1178689/p61-liu.pdf?key1=1178689&key2=6322461811&coll=GUIDE&dl=GUIDE&CFID=21123267&CFTOKEN=91967441>>, ACM, MIR'06, Oct. 26-27, 2006, pp. 61-69.

Saber, et al., "Automatic Image Annotation Using Adaptive Color Classification", retrieved at <<http://www.rit.edu/~esseee/docs/15.pdf>>, Graphical Models and Image Processing, vol. 58, No. 2, Mar. 1996, pp. 115-126.

Saykol, et al., "A Semi Automatic Object Extraction Tool for Querying in Multimedia Databases", available at least as early as Nov. 14, 2007, at <<http://www.cs.bilkent.edu.tr/~bilmdg/papers/mis01.pdf>>, Department of Computer Engineering, Bilkent University, Ankara, Turkey, 10 pgs.

Suh, et al., "Semi-Automatic Image Annotation Using Event and Torso Identification", available at least as early as Nov. 14, 2007, at <<http://hcil.cs.umd.edu/trs/2004-15/2004-15.pdf>>, 4 pgs.

Wang, et al., "Automatic Image Annotation and Retrieval Using Subspace Clustering Algorithm", available at least as early as Jun. 12, 2007, at <<http://delivery.acm.org/10.1145/1040000/1032621/p100-wang.pdf?key1=1032621&key2=2890461811&coll=GUIDE&dl=GUIDE&CFID=21121103&CFTOKEN=32821806>>, ACM, MMDB'04, Nov. 13, 2004, pp. 100-108.

Wang, et al., "Automatic Image Annotation and Retrieval Using Weighted Feature Selection", available at least as early as Jun. 12, 2007, at <<http://www.utdallas.edu/~lkhan/papers/MTA1.pdf>>, 17 pgs.

Hua, et al., "Semantic Knowledge Extraction and Annotation for Web Images", In the Proceedings of the 13th Annual ACM International Conference on Multimedia, Nov. 2005, pp. 467-470.

Jing et al, "An Effective Region-Based Image Retrieval Framework," ACM, Multimedia '02 Proceedings of the tenth ACM international conference on Multimedia, Dec. 2002, 10 pgs.

Rui, et al., "A Novel Approach to Auto Image Annotation Based on Pair-wise Constrained Clustering and Semi-naive Bayesian Model", IEEE, In the Proceedings of the 11th International Multimedia Modelling Conference, Jan. 2005, pp. 322-327.

Final Office Action for U.S. Appl. No. 11/956,331, mailed on Jul. 8, 2011, Mingjing Li, "Dual Cross-Media Relevance Model for Image Annotation", 21 pgs.

Non-Final Office Action for U.S. Appl. No. 12/369,421, mailed on Feb. 16, 2012, Linjun Yang et al., "Visual and Textual Query Suggestion", 23 pages.

Baeza-Yates et al., "Query Recommendation using Query Logs in Search Engines", retrieved on Dec. 31, 2008 at <<http://www.dcc.uchile.cl/~churtado/clustwebLNCS.pdf>>, 10 pages.

Beeferman, et al., "Agglomerative Clustering of a Search Engine Query Log", retrieved on Dec. 31, 2008 at <<http://www.dougb.com/papers/kdd.pdf>>, 10 pages.

Boyd, et al., "Convex Optimization", Book, Cambridge University Press, Mar. 2004, 730 pages.

Burstein, "Building an IE8 Visual Search Suggestion Provider for my Twitter Friends", retrieved on Dec. 31, 2008 at <<http://blogs.microsoft.co.il/blogs/bursteg/archive/2008/12/17/building-an-ie8-visual-search-suggestion-provider-for-my-twitter-friends.aspx>>, 13 pgs.

Carpineto, et al., "An Information Theoretic Approach to Automatic Query Expansion", retrieved on Dec. 31, 2008 at <<http://search.fub.it/claudio/pdf/TOIS2001.pdf>>, 35 pages.

Crum, "Yahoo Suggestions for Image Search", retrieved on Dec. 31, 2008 at <<http://www.webpronews.com/topnews/2008/12/03/yahoo-suggestions-for-image-search>>, Dec. 3, 2008, pp. 1-4.

Datta, et al., "Image Retrieval: Ideas, Influences, and Trends of the New Age", retrieved on Dec. 31, 2008 at <<http://infolab.stanford.

edu/~wangz/project/imsearch/review/JOUR/datta.pdf>>, ACM Computing Surveys, vol. 40, No. 2, Article 5, Publication date: Apr. 2008, 60 pages.

"Flickr", retrieved on Dec. 31, 2008 at <<http://www.flickr.com/>>, 1 pg.

Frey, et al., "Clustering by Passing Messages Between Data Points", retrieved on Dec. 31, 2008 at <<http://www.psi.toronto.edu/affinitypropagation/FreyDueckScience07.pdf>>, Science Magazine, vol. 315, Feb. 16, 2007, 23 pages.

"Google Image Search", retrieved on Dec. 31, 2008 at <<http://images.google.com/>>, Google, 2008, 1 pg.

He, et al., "Learning an Image Manifold for Retrieval", retrieved on Dec. 31, 2008 at <<http://delivery.acm.org/10.1145/1030000/1027532/p17-he.pdf?key1=1027532&key2=4414980321&coll=GUIDE&dl=GUIDE&CFID=16377253&CFTOKEN=92469850>>, MM 2004, Oct. 10-16, New York, USA, pp. 17-23.

"How Do You Create Search Features for Internet Explorer 8 Beta 2?", retrieved on Dec. 31, 2008 at <<http://www.code-magazine.com/article.aspx?quickid=0811072&page=2>>, CoDe Magazine, 2008, vol. 5, Issue 3, IE8, 9 pages.

Huang, et al., "Spatial Color Indexing and Applications", retrieved on Dec. 31, 2008 at <<http://ieeexplore.ieee.org/stamp/stamp.jsp?arnumber=710779&isnumber=15374>>, IEEE Xplore, pp. 602-607.

Jia, et al., "Finding Image Exemplars Using Fast Sparse Affinity Propogation", retrieved on Dec. 30, 2008 at <<http://delivery.acm.org/10.1145/1460000/1459448/p639-jia.pdf?key1=1459448&key2=6654980321&coll=GUIDE&dl=GUIDE&CFID=16934217&CFTOKEN=19327438>>, MM 2008, Oct. 26-31, Vancouver, BC, Canada, pp. 639-642.

Lam-Adesina, et al., "Applying Summarization Techniques for Term Selection in Relevance Feedback", ACM, New York, New York, Annual ACM Conference on Research and Development in Information Retrieval, Proceedings of the 24th annual international ACM SIGIR conference on Research and development in information retrieval, Sep. 2001, pp. 1-9.

Lew, et al., "Content-based Multimedia Information Retrieval: State of the Art and Challenges", retrieved on Dec. 31, 2008 at <<http://www.liacs.nl/home/mlew/mir.survey16b.pdf>>, ACM Transactions on Multimedia Computing, Communications, and Applications, Feb. 2006, 26 pgs.

"Live Image Search", retrieved on Dec. 31, 2008 at <<http://image.live.com>>, Microsoft Corp., 2009, 1 pg.

Final Office Action for U.S. Appl. No. 12/369,421, mailed on Sep. 15, 2011, Linjun Yang, "Visual and Textual Query Suggestion", 21 pages.

Sigurbjornsson, et al., "Flickr Tag Recommendation based on Collective Knowledge", retrieved on Dec. 31, 2008 at <<http://www2008.org/papers/pdf/p327-sigurbjornssonA.pdf>>, WWW 2008, Apr. 21-25, Beijing, China, pp. 327-336.

Smeulders, et al., "Content-Based Image Retrieval at the End of the Early Years", retrieved on Dec. 31, 2008 at <<http://ieeexplore.ieee.org/stamp/stamp.jsp?arnumber=00895972>>, IEEE Transactions on Pattern Analysis and Machine Intellegence, vol. 22, No. 12, Dec. 2000, pp. 1349-1380.

Snoek, et al., "MediaMill: Video Search Using a Thesaurus of 500 Machine Learned Concepts", retrieved on Dec. 31, 2008 at <<http://staff.science.uva.nl/~cgmsnoek/pub/snoek-demo-samt2006.pdf>>, Intelligent Systems Lab Amsterdam, Informatics Institute, University of Amsterdam, The Netherlands, pp. 1-2.

Swets, et al., "Using Discriminant Eigenfeatures for Image Retrieval", IEEE Transactions on Pattern Analysis and Machine Intelligence, vol. 18, 1996, pp. 831-836, 6 pgs.

Weinberger, et al., "Resolving Tag Ambiguity", retrieved on Dec. 31, 2008 at <<http://research.yahoo.com/files/ctfp6043-weinberger.pdf>>, MM 2008, Oct. 26-31, Vancouver, BC, Canada, 9 pages.

Wen, et al., "Clustering User Queries of a Search Engine", retrieved on Dec. 31, 2008 at <<https://research.microsoft.com/en-us/um/people/jrwen/jrwen_files/publications/QC-WWW10.pdf>>, WWW10, May 1-5, 2001, Hong Kong, pp. 162-168.

Worring, et al., "The MediaMill Large-lexicon Concept Suggestion Engine", retrieved on Dec. 31, 2008 at <<http://staff.science.uva.nl/~cgmsnoek/pub/worring-demo-acm2006.pdf>>, MM 2006, Oct. 23-27, Santa Barbara, CA., 2 pages.

"XML Search Suggestions Format Specification", retrieved on Dec. 31, 2008 at <<http://msdn.microsoft.com/en-us/library/cc848863(VS.85).aspx>>, Microsoft Corporation 2009, 6 pages.

Xu, et al., "Query Expansion Using Local and Global Document Analysis", retrieved on Dec. 31, 2008 at <<http://citeseerx.ist.psu.edu/viewdock/download?doi=10.1.1.49.3174&rep=rep1&type=pdf>>, Center for Intelligent Information Retrieval, Computer Science Department, University of Massachusetts, MA., 8 pages.

Xue, et al., "Improving Web Search Using Image Snippets", retrieved on Dec. 31, 2008 at <<http://cs.nju.edu.cn/zhouzh/zhouzh.files/publication/toit08.pdf>>, ACM 2008, 27 pages.

"Yahoo! Image Search", retrieved on Dec. 31, 2008 at <<http://images.search.yahoo.com/>>, Yahoo! 2008, 1pg.

Yu, et al., "Improving Pseudo-Relevance Feedback in Web Information Retrieval Using Web Page Segmentation", retrieved on Dec. 31, 2008 at <<http://www2003.org/cdrom/papers/refereed/p300/p300-Yu.html>>, WWW2003, May 20-24, 2003, Budapest, Hungary, 13 pages.

Zhou, et al., "Ranking on Data Manifolds", retrieved on Dec. 31, 2008 at <<http://www.kyb.mpg.de/publications/pdfs/pdf2334.pdf>>, Max Planck Institute for Biological Cybernetics, Germany, 8 pages.

Riaz et al., "Efficient Image Retrieval Using Adaptive Segmentation of HSV Color Space" International conference on Computational Sciences and Its Applications (ICCSA), Jun. and Jul. 2008, 6 pages.

Zhu et al., "New Query Refinement and Semantics Integrated Image Retrieval System with Semiautomatic Annotation Scheme", Journal of Electronic Imaging, vol. 10(4), Oct. 2001, 11 pages.

Office action for U.S. Appl. No. 11/956,331, mailed on Mar. 18, 2013, Li et al., "Dual Cross-Media Relevance Model for Image Annotation", 22 pages.

* cited by examiner

SUBMIT 'X', 'Y', 'X Y' TO IMAGE SEARCH ENGINE, AND OBTAIN THREE SETS OF IMAGES, DENOTED AS $S_X$, $S_Y$, $S_{XY}$, WHICH ARE THE TOP N RESULTS IN SEARCHED PAGES RESPECTIVELY
410

FOR EACH IMAGE, EXTRACT MULTI-MODAL VISUAL FEATURES WHICH ARE NORMALIZED TO CHARACTERIZE VARIOUS VISUAL PROPERTIES OF IMAGES
420

FOR EACH SET, CALCULATE THE VALUE OF VISUAL CONSISTENCE
430

CALCULATE WORD CORRELATION BETWEEN X AND Y
440

Fig. 4

ESTIMATING WORD CORRELATIONS FROM IMAGES

PRIORITY AND RELATED APPLICATIONS

This patent application claims priority to U.S. provisional patent application Ser. No. 60/972,167, entitled "Estimating Word Correlations from Image Search" filed on Sep. 13, 2007. This patent application is also related to the commonly-owned U.S. patent application Ser. No. 11/956,331, entitled "DUAL CROSS-MEDIA RELEVANCE MODEL FOR IMAGE ANNOTATION", filed on even date with the present patent application, which U.S. patent application is hereby incorporated by reference.

BACKGROUND

Word correlations broadly refer to semantic relationships existing amount words. For example, a measure of semantic similarity may be defined between two words to reflect how likely they are semantically related to each other. Two words might be closely related to each other as synonyms or antonyms, but may also be related to each other in less direct semantic meanings. Word correlations may be used to expand queries in general web search or to refine the keyword annotations in image search.

The current methods for defining and finding word correlations are text-based. Text-based methods typically estimate the correlation between two words via statistical or lexical analysis. For example, corpus-based co-occurrence statistics may provide useful solutions. Lexical analysis based on WORDNET, a semantic lexicon for the English language, may also provide useful solutions. WORDNET is considered to be better suited than conventional dictionaries for computerized analysis of semantic relationships because WORDNET groups English words into sets of synonyms called synsets, provides short, general definitions, and records the various semantic relations between these synonym sets. These text-based methods all have limitations. The corpus-based method only utilizes the textual information. Semantic lexicons such as WORDNET can only handle a limited number of words.

Although corpus-based co-occurrence statistics and semantic lexicons help to produce a combination of dictionary and thesaurus that is more intuitively usable, and to support automatic text analysis and artificial intelligence applications, further improvement on methods for defining and finding word correlations is desirable, particularly in the search-related context.

SUMMARY

In this disclosure, content-based techniques are proposed to estimate word correlations. The techniques provide an image representation of each subject word that is being analyzed, and estimate word correlations using visual features of image representations of the words. The image representations of the subject words may be generated by retrieving images from data sources (such as the Internet) using image search with the subject words as query words.

One aspect of the techniques is based on calculating a visual distance or visual similarity between the sets of retrieved images corresponding to each query word. Another aspect is based on calculating a visual consistence among the set of the retrieved images corresponding to a conjunctive query word. In one embodiment, a dynamic partial variance (DPV) is used for analyzing visual consistence based on multiple image features. The method selects a subset of low-variance image features from multiple image features extracted from the image set, and calculates a partial variance of the subset of image features. The subset of image features may be selected dynamically as the conjunctive image representation varies. In another embodiment, the content-based method is combined with a text-based method to produce even better result.

The obtained word correlations represent semantic relationships existing amount the subject words, and may be used in a variety of applications such as expanding queries in general web search or to refining keyword annotations in image search.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

FIG. 4 is a flowchart of the exemplary process of FIG. 3.

DETAILED DESCRIPTION

Overview

Figure 1:
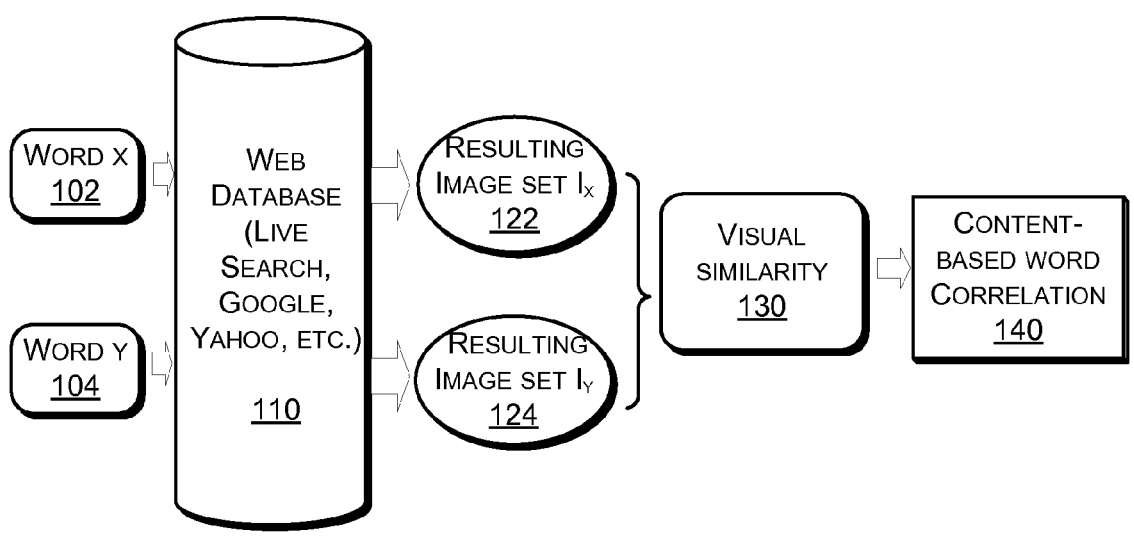
FIG. 1 is a block illustration of an exemplary process for estimating word correlation based on visual distance or visual similarity of an image search result.

The present disclosure describes techniques for estimating word correlations from image representations of the subject words. In contrast to conventional methods which estimate word correlations directly based on textual information of the words, the techniques described herein first obtains image representations of the subject words and then indirectly derive the word correlation by analyzing the image features of the image representations. It is believed that, with properly chosen image representations of the subject words, the relationship among the image features of the image representations of the subject words constitutes an alternative, and potentially more effective, source of information from which the semantic relationship of the subject words may be derived. The techniques described herein open a new domain for word correlation estimation.

One aspect of the techniques is based on the visual distance between the sets of retrieved images corresponding to each querying word respectively. The other is based on the visual consistence among the search result, taking into consideration the distribution of visual features among the resulting images of the search. A combination of text-based and content-based methods may produce even better result.

In one embodiment, the image representations are obtained using image search, such as Web image search. Commercial image search is becoming increasingly more popular and powerful. When a keyword is submitted as a query to the image search engine, a set of images are returned as the search result, among which top-ranked images are deemed more relevant to the query. The techniques disclosed herein treat a search result as a visual representation of the query. The visual features of the retrieved images are explored to provide additional information to estimate the word correlation.

Because the Web represents the largest publically available corpus with aggregate statistical and indexing information, the Web search-based method may provide a comprehensive solution for estimating word correlations. Furthermore, a rapidly growing Web bodes well for the presently described techniques, as the techniques may become even more effective as the image content of the Web becomes richer.

One aspect of the present disclosure is a method for estimating word correlations. The method first provides an image representation of a first word and an image representation of a second word, and then estimates a correlation between the first word and the second word at least partially based on visual features of the image representations.

In one embodiment, estimating the correlation between the first word and second word is done by calculating a visual distance or a visual similarity between the image representation of the first word and the image representation of the second word. As will be illustrated in the exemplary embodiments described herein, the image representation of each subject word may be an image set including a plurality of images selected from an image database such as a Web image database. For example, the image representations of the first word and the second word may be provided by conducting an image search using the respective word (the first word or the second word) as query word, and selecting a plurality of images from search results. Preferably, the images are selected from top returns of the search results. The method calculates the visual distance or visual similarity between the two image sets to estimate the correlation between the two subject words.

In an alternative embodiment, the method provides a conjunctive image representation of the first word and the second word, and estimates the correlation between the first word and second word further based on visual features of the conjunctive image representation of the first and the second words. The conjunctive image representation may be an image set having a plurality of images, and in this case the method estimates the correlation between the first word and second word by calculating a visual consistence of the images in the image set. Similarly, the conjunctive image representation of the first word and the second word may be provided by first performing an image search using the first word and the second word as a conjunctive query word, and selecting a plurality of images from search results.

In one exemplary embodiment, a partial variance scheme is introduced to estimate the correlation between the first word and the second word. The method selects a subset of image features from a plurality of image features extracted from the image set, and calculates a partial variance of the subset of image features. As described in exemplary embodiments below, the subset of image features may include image features having relatively low variance. The subset of image features may be selected dynamically as the conjunctive image representation varies.

The techniques are described in further detail below. Exemplary processes are described using block illustrations and flowcharts. The order in which the method is described is not intended to be construed as a limitation, and any number of the described method blocks may be combined in any order to implement the method, or an alternate method.

Exemplary Embodiments

A. Word Correlation Estimation Based on Visual Distance of Image Search Result

FIG. 1 is a block illustration of an exemplary process for estimating word correlation based on visual distance or visual similarity of an image search result.

Block 102 represents a first subject word x being submitted as a search query word. Block 104 represents a second subject word y being submitted as a search query word. The search query words x and y (102 and 104) are submitted separately to a search engine which conducts an image search through a Web database 110. The first image search using the first query word x results in an image set Ix 122, while the second image search using the second query word y results in an image set Iy 124.

Visual distance or visual similarity 130 between the image set Ix and the image set Iy is then calculated using an algorithm described in a later section of this description. Content-based word correlation 140 is finally calculated based on the visual similarity 130.

Figure 2:
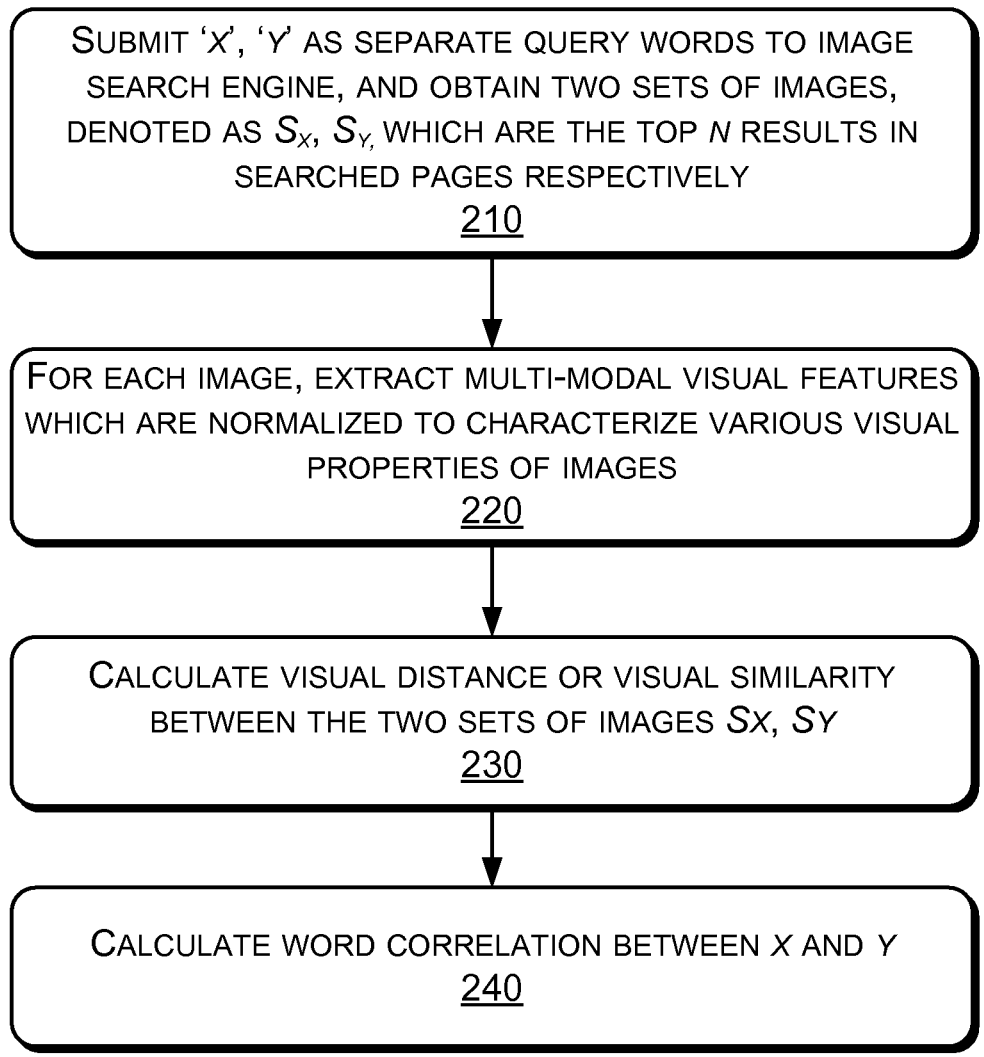
FIG. 2 is a flowchart of the exemplary process of FIG. 1.

FIG. 2 is a flowchart of the exemplary process of FIG. 1. At block 210, the method submits word x and word y as separate query words to an image search engine, and obtains two sets of images, denoted as Sx and Sy, which are the top n results in searched pages of the respective search.

At block 220, the method extracts, from each image of the image sets Sx and Sy, multi-modal visual features, and normalizes the extracted multi-modal visual features to characterize various visual properties of the images.

At block 230, the method calculates a visual distance or visual similarity between the two image sets Sx and Sy using an algorithm described in a later section of the present description.

At block 240, the method calculates a word correlation between word x and word y based on the visual distance or visual similarity between the two image sets Sx and Sy calculated above.

Given a keyword query, image search engines such as LIVE SEARCH, GOOGLE, or YAHOO! usually return good searching results, especially those images on the first page. Thus, top-ranked images as collective image sets can be roughly treated as a visual representation of the respective query word. The visual similarity between two resulting image sets can be then used to represent the relation between corresponding query words. The visual similarity can be quantitatively calculated based on the visual features of the image set. In one embodiment, each image has multiple image features represented by a vector, and each image set forms of vector set. The disclosed techniques adopt a simple strategy to calculate the visual similarity between both vector sets. The visual-based word correlation is given as follows:

$$K_{VC}(x, y) = S_I(I(x), I(y))$$
$$= \sum_{m,n} S(I_m(x), I_n(y))$$

where $K_{VC}(x,y)$ indicates the visual-based word correlation between words x and y; $I(x)$ and $I(y)$ indicate the resulting image sets by the word x and y respectively; $I_m(x)$ is the $m^{th}$ image in the image set $I(x)$; $S_I(.)$ is the similarity between both sets; and $S(.)$ is the similarity between two images, and m, n=1, 2, ..., M, where M is the number of top images from the resulting images.

B. Word Correlation Estimation Based on Visual Consistence of Image Search Result As discussed herein, top-ranked images in a search result can be roughly treated as the visual representation of the search concept. From another point of view, the visual consistence among these resulting images reflects the semantic uniqueness of the query keyword to some extent. For example, word 'jaguar' may represent an animal, a car or a plane. That is, the word has more than one specific meaning. When the word is used as a query, the search results from an image search engine may include images of different concepts. Those images have varied colors, shape or texture, thus are not visually consistent.

When two words with the conjunctive operator (AND) are submitted as one query, the returned images are those indexed by both words. The returned images may be considered as a conjunctive image representation of the two words submitted with the conjunctive operator (AND). If the words are not semantically related to each other, they are unlikely to be associated with the same images or visually similar images together. Accordingly, the search results may be very noisy and not visually consistent. Based on this consideration, the visual consistence of the search results is believed to be a good indicator of the correlation between words.

Figure 3:
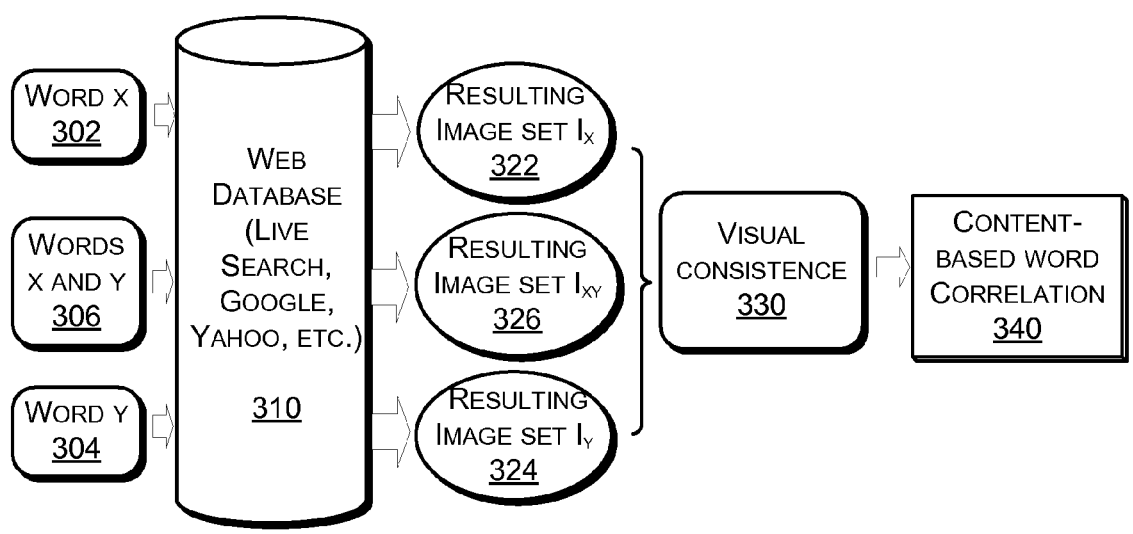
FIG. 3 is a block illustration of an exemplary process for estimating word correlation based on visual consistence of a conjunctive image representation of the two words submitted with conjunctive operator (AND).

FIG. 3 is a block illustration of an exemplary process for estimating word correlation based on visual consistence of the conjunctive image representation of the two words submitted with the conjunctive operator (AND).

Block 302 represents a first subject word x being submitted as a search query word. Block 304 represents a second subject word y being submitted as a search query word. Block 306 represents a conjunctive word x AND y being submitted as a search query word. The search query words x, y and x AND y (302, 304 and 306) are submitted separately to a search engine which conducts an image search through a Web database 310. The first image search using the first query word x results in an image set Ix 322, the second image search using the second query word y results in an image set Iy 324, while the third image search using the conjunctive query word x AND y results in an image set Ixy 326.

Visual consistence 330 in the image set Ixy is then calculated using an algorithm described in a later section of the present description. Content-based word correlation 340 is finally calculated based on the visual similarity 330.

FIG. 4 is a flowchart of the exemplary process of FIG. 3. At block 410, the method submits word x, word y and conjunctive word x AND y as separate query words to an image search engine, and obtains a three sets of images, denoted as Sx, Sy, and Sxy which are the top n results in searched pages of the respective search.

At block 420, the method extracts, from each image of the image sets $S_x$, Sy, and $S_{xy}$, multi-modal visual features, and normalizes the extracted multi-modal visual features to characterize various visual properties of the images.

At block 430, the method calculates a visual consistence of the image set Sxy using an algorithm described herein below.

At block 440, the method calculates a word correlation between word x and word y based on the visual consistence of the image set Sxy.

In one embodiment, the disclosed techniques use the variances of visual features to describe the visual consistence. Generally, less variance of visual features corresponds to greater consistence on the visual appearance, and vice versa.

With multimodal image features extracted, it is preferred that some image features are given more weight than others in calculating the visual variance in order to better imitate actual human visual cognition. From studies of cognitive psychology, it is learned that human infers overall similarity based on the aspects that are similar among the compared objects, rather than based on the dissimilar ones. Accordingly, in one embodiment, a new measure called Dynamic Partial Variance (DPV), which focuses on the features with low variances and activates different features for different image sets, is introduced as described below.

Assuming the variances of each dimensional feature among images in set S are ordered as $var_1(S) \leqq var_2(S) \leqq \ldots \leqq var_d(S)$, the DPV is defined as:

$$DPV(S) = \frac{1}{l} \sum_{i=1}^{l \leq d} var_i(S) \quad (2)$$

where d is the total dimension for various visual features, and l is the number of similar aspects activated in the measure. This allows a subset of image features to be selected from all image features extracted from the image set, and a selective partial variance of the subset of image features to be calculated. The subset of image features includes image features having relatively low variance. A threshold may be set for the purpose of making the cut among the image features. The subset of image features may be selected dynamically as the conjunctive image representation varies. That is, the image features that make the cut to be selected into the subset for calculating DPV may be different for different image representations. Furthermore, l the number of similar aspects activated in the measure might also vary from one image representation to another.

To ensure that the DPVs of the resulting images given a word-pair query are comparable to each other, these values are normalized according to the semantic uniqueness of the single word, i.e., the DPV of the resulting images given a single-word query. The normalized correlation between word x and word y is given as:

$$K_{CC}(x, y) = \exp\left(-\sigma_2 \cdot \frac{DPV(S_{xy})}{\min\{DPV(S_x), DPV(S_y)\}}\right) \quad (3)$$

where σ2>0 is a smoothing parameter.

C. Combined Word Correlation

The above-described content-based methods for estimating word correlations may be used either separately or in combination. For example, the two types of word correlations described above with different characteristics may be combined to calculate a combined word correlation.

To make different correlations complement each other, an exemplary embodiment proposes to unify all word relations in a linear form after they are normalized into [0, 1]. Better performance is expected when more sophisticated combinations are used. An exemplary linear combination is given as:

$$S_{WWR} = \epsilon K_{SCS} + (1-\epsilon) K_{CCS} \quad (4)$$

where 0<ϵ<1, and experientially ϵ=0.5 in an exemplary implementation.

Furthermore, either or both of the above content-based methods may be further combined with an alternative method, such as a text-based method for estimating word correlations, to estimate a more balanced word correlation using a formula similar to the above Eq. (4).

One example of text-based method for estimating word correlations is statistical correlation by search. This method is based on the following hypothesis: the relative frequency whereupon two words appear on the web within the same documents is a measure of their semantic distance. Based on this hypothesis, an embodiment of the disclosed method defines a word correlation using image search (e.g., GOOGLE image searcher) to obtain a general correlation measure for any word-pair.

For example, a word correlation using image search may be defined according to the following equation, borrowing a concept of Normalized GOOGLE Distance (NGD) for the text retrieval:

$$NGD(x, y) = \frac{\max\{\log f(x), \log f(y)\} - \log f(x, y)}{\log G - \min\{\log f(x), \log f(y)\}}$$

where x and y are two words in the lexicon; G is the total number of images indexed by the search engine (e.g., GOOGLE search engine); f(x) is the count of images which are indexed by the word x in the image searcher; f(y) is the count of images which are indexed by the word y in the image searcher; and f(x, y) is the count of images which are indexed by both x and y. A bounded measure which increases according to the degree of semantic correlation is also used. As a result, a general transform F(.) to obtain the NGD-based word correlation may be defined as:

$$K_{SCS}(x, y) = F(NGD(x, y))$$
$$= \exp[-\gamma \cdot NGD(x, y)]$$

where γ is an adjustable factor.

Although the above Eq. (5) is similar to an existing method defining a Normalized GOOGLE Distance (NGD) for the text retrieval, the meaning is quite different. In the textural NGD, x and y are two query words for text search, G is the total number of web pages indexed by GOOGLE, f(x) is the count of pages where word x appears, f(y) is the count of pages where word y appears, and f(x, y) is the count of pages where both x and y appear.

In general, the smaller the value of NGD is, the more relevant the two words are on semantics. Though the NGD may be less effective on evaluating the triangular inequality property of distance, it provides an effective measure of how far two terms are related semantically. Furthermore, experimental results demonstrate that the NGD stabilizes with the growing GOOGLE dataset. That is, the method may become scale invariant as the scale increases.

Since the range of NDG values is from 0 to ∞, $S_{WWR}(x, y)$ ranges from 0 to 1. The value of G (i.e., the total number of indexed images) has not been published officially, but it may be inferred from available reported results or regulated in experiments. One embodiment refers to a report in August 2005 in which the total number of indexed images in GOOGLE image searcher is reported to be 2,187,212,422 (http[colon][forward_slash] forward_slash]blog.search-enginewatch.com/blog/050809-200323). With the fast development of various web techniques, one may conservatively double the count two years after that report. An exemplary G is then set to be about 4.5 billion in experiments used for testing the disclosed method.

Word correlations obtained using the techniques described herein may have a great variety of uses. One example is image annotation in which word correlation is used to refine and expand candidate annotations. A well-defined word correlation enhances the performance of image annotation.

Implementation Environment

The above-described method may be implemented with the help of a computing device, such as a server, a personal computer (PC) or a portable device having a computing unit.

Figure 5:
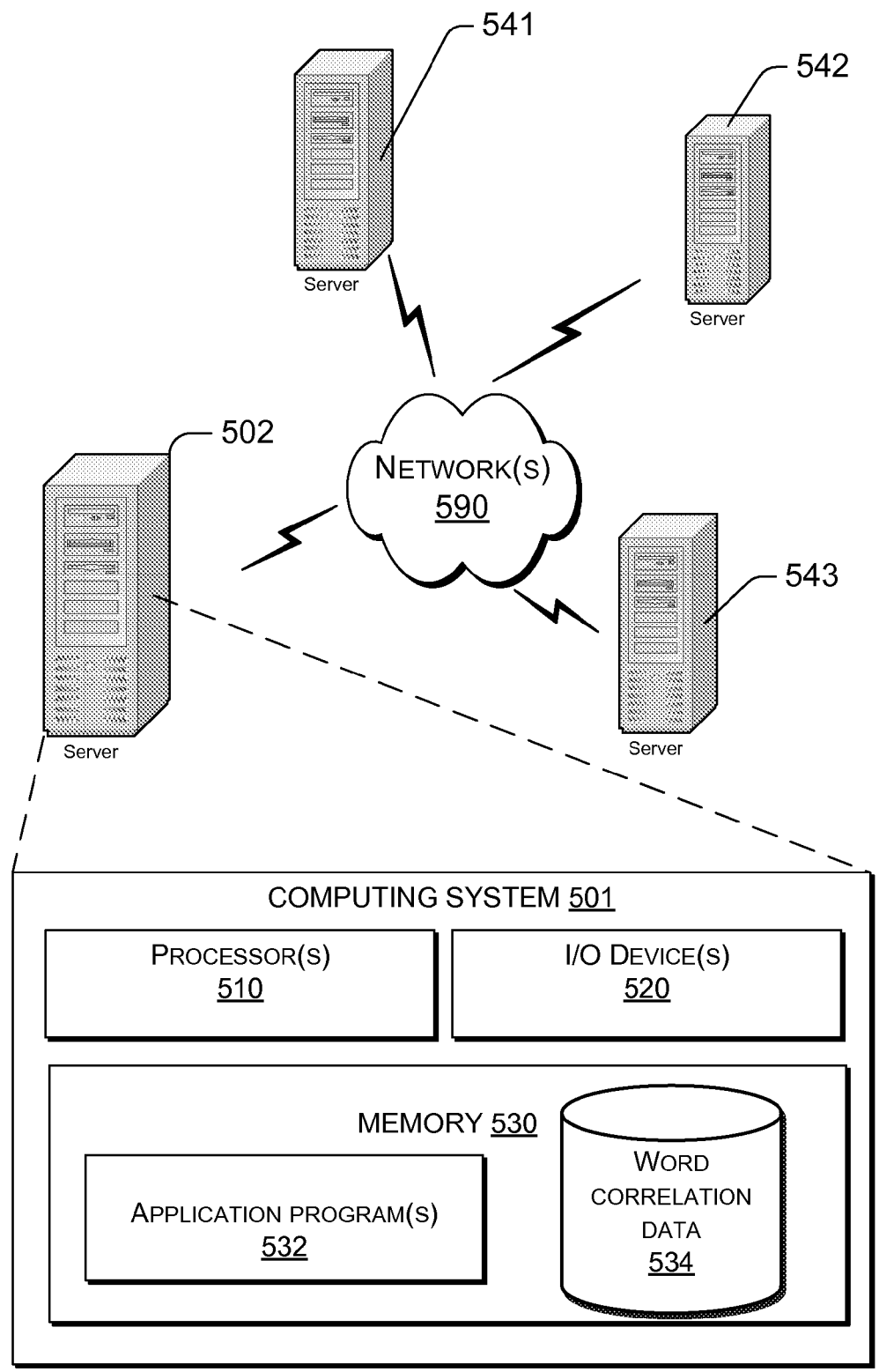
FIG. 5 shows an exemplary environment for implementing the method of the present disclosure.

FIG. 5 shows an exemplary environment for implementing the method of the present disclosure. Computing system 501 is implemented with computing device 502 which includes processor(s) 510, I/O devices 520, computer readable media (e.g., memory) 530, and network interface (not shown). The computer readable media 530 stores application program modules 532 and data 534 (such as word correlation data). Application program modules 532 contain instructions which, when executed by processor(s) 510, cause the processor(s) 510 to perform actions of a process described herein (e.g., the processes of FIGS. 1-4).

For example, in one embodiment, computer readable medium 530 has stored thereupon a plurality of instructions that, when executed by one or more processors 510, causes the processor(s) 510 to:

(a) provide an image representation of a first word and an image representation of a second word; and (b) estimate a correlation between the first word and the second word at least partially based on visual features of the image representations of the first word and the second word.

In one embodiment, the processor(s) 510 provides image representations of words by conducting image searches via network(s) 590 to retrieve image data from multiple data sources such as servers 541, 542 and 543.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

CONCLUSION

In contrast to conventional methods, the techniques described herein do not estimate word correlations directly based on textual information of the words. Instead, the techniques first obtain image representations of the subject words and then indirectly derive the word correlation by analyzing the image features of the image representations. With properly chosen image representations of the subject words, especially with the help of modern image search engine and the growing image data source on the Internet, the relationships among the image features of the image representations constitute an alternative and/or additional, and potentially more effective, source of information for deriving the semantic relationship of words (e.g., word correlations). The techniques described herein thus open a new field for word correlation estimation.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for estimating word correlations, comprising:
a processor; and
a computer readable storage media having stored thereupon a plurality of instructions that, when executed by the processor, cause the processor to perform acts comprising:
providing a first image representation set having a first plurality of images representing a first word in response to a first search based at least in part on the first word and a second image representation set having a second plurality of images representing a second word in response to a second search based at least in part on the second word;
extracting, from at least one image of the first image representation set and from at least one image of the second image representation set, multi-modal visual features; and
estimating a correlation between the first word and the second word at least partially based on a calculation of a mathematical function having at least the extracted multi-modal visual features corresponding to the first image representation set and at least the extracted multi-modal visual features corresponding to the second image representation set as variables thereto, wherein estimating the correlation includes:
selecting one of a first correlation function for a calculation of an inter-set visual aspect correlation based on multiple images of the first image representation set and multiple images of the second image representation set and a second correlation function for a calculation of an intra-set visual aspect correlation based on multiple images within one of the first image representation set and the second image representation set; and
calculating the selected correlation function.

2. The system as recited in claim 1, wherein the selected correlation function is the first correlation function, and wherein calculating the selected correlation function comprises:
calculating a visual distance or a visual similarity between the first image representation set and the second image representation set.

3. The system as recited in claim 1, wherein providing the first and the second image representation sets representing the first word and the second word comprises:
conducting an image search using the respective first word or second word as query word; and
selecting a third plurality of images from search results.

4. The system as recited in claim 3, wherein the image search is conducted on the Internet using an image search engine.

5. The system as recited in claim 3, wherein the third plurality of images are selected from top returns of the search results.

6. The system as recited in claim 1, further comprising:
providing a set of images representing conjunction of the first word and the second word, the set of images comprising a third plurality of images,
wherein estimating the correlation between the first word and second word is further based on visual features of the set of images representing conjunction of the first word and the second word.

7. The system as recited in claim 6, wherein estimating the correlation between the first word and second word comprises calculating a visual consistence of the set of images representing conjunction of the first word and the second word.

8. The system as recited in claim 6, wherein providing the set of images representing conjunction of the first word and the second word comprises:
performing an image search using the first word and the second word as a conjunctive query word; and
selecting a fourth plurality of images from search results.

9. The system as recited in claim 6, wherein the selected correlation function is the second correlation function, and wherein calculating the selected correlation function comprises:
calculating a first visual consistence of the first image representation set representing the first word;
calculating a second visual consistence of the second image representation set representing the second word; and
calculating a third visual consistence of the set of images representing conjunction of the first word and the second word; and wherein the estimating the correlation between the first word and the second word comprises evaluating a function having the first visual consistence, the second visual consistence and the third visual consistence as terms thereof.

10. A system for estimating word correlations, comprising:
a processor; and
a computer readable storage media having stored thereupon a plurality of instructions that, when executed by the processor, cause the processor to perform acts comprising:
providing a first image representation set having a first plurality of images representing a first word in response to a first search based at least in part on the first word and a second image representation set having a second plurality of images representing a second word in response to a second search based at least in part on the second word;
extracting, from at least one image of the first image representation set and from at least one image of the second image representation set, multi-modal visual features; and
estimating a correlation between the first word and the second word at least partially based on a calculation of a mathematical function having at least the extracted multi-modal visual features corresponding to the first image representation set and at least the extracted multi-modal visual features corresponding to the second image representation set as variables thereto, wherein estimating the correlation between the first word and the second word includes:
calculating a content correlation between the multi-modal visual features of the image representations of the first word and the second word;
calculating a text correlation between the first word and the second word using a text-based method; and
estimating the correlation between the first word and the second word by combining the content correlation and the text correlation.

11. The system as recited in claim 10, wherein providing the first and the second image representation sets representing the first word and the second word comprises:
  conducting an image search using the respective first word or second word as query word; and
  selecting a third plurality of images from search results.

12. The system as recited in claim 11, wherein the image search is conducted on the Internet using an image search engine.

13. The system as recited in claim 11, wherein the third plurality of images are selected from top returns of the search results.

14. A method for estimating word correlations, the method comprising:
  providing a computing device with a conjunctive image representation of a first word and a second word, the conjunctive image representation comprising a first set of multiple images;
  providing the computing device with a first image representation of the first word and a second image representation of the second word, the first image representation of the first word comprising a second set of multiple images, and the second image representation of the second word comprising a third set of multiple images; and
  estimating, by the computing device, a correlation between the first word and second word at least partially based on a calculation of visual features calculated from the first set of multiple images comprising the conjunctive image representation of the first word and the second word, the second set of multiple images comprising the first image representation of the first word and the third set of multiple images comprising the second image representation of the second word.

15. The method as recited in claim 14, wherein estimating, by the computing device, the correlation between the first word and second word comprises calculating, by the computing device, a visual consistence of the first set of multiple images.

16. The method as recited in claim 14, wherein estimating, by the computing device, the correlation between the first word and the second word comprises:
  selecting a subset of image features from a plurality of image features extracted from the first set of multiple images, wherein the subset of image features includes at least one image feature having a low variance according to a preset variance threshold; and
  calculating a partial variance of the subset of image features.

17. The method as recited in claim 16, wherein selecting the subset of image features is performed dynamically as the conjunctive image representation varies.

18. The method as recited in claim 14, wherein providing the conjunctive image representation of the first word and the second word comprises:
  conducting an image search using the first word and the second word as a conjunctive query word; and
  selecting a plurality of images from search results.

19. One or more computer readable storage media device having stored thereupon a plurality of instructions that, when executed by a processor, causes the processor to:
  provide a first image representation of a first word in response to a first search based at least in part on the first word and a second image representation of a second word in response to a second search based at least in part on the second word, the first image representation comprising a first set of images having a first plurality of images, the second image representation comprising a second set of images having a second plurality of images;
  select one of a first correlation function for a calculation of an inter-set visual aspect correlation based on multiple images of the first set of images and multiple images of the second set of images or a second correlation function for a calculation of an intra-set visual aspect correlation based on multiple images within one of the first set of images and the second set of images;
  calculate the selected correlation function; and
  estimate a correlation between the first word and the second word at least partially based on the calculation of the selected correlation function.

20. The computer readable storage media device as recited in claim 19, wherein the processor estimates the correlation between the first word and second word by calculating a visual distance or a visual similarity between the first image representation of the first word and the second image representation of the second word.

21. The computer readable storage media device as recited in claim 19, wherein the plurality of instructions, when executed by a processor, further causes the processor to:
  provide a conjunctive image representation of the first word and the second word, wherein the processor estimates the correlation between the first word and second word further based on visual features of the conjunctive image representation of the first word and the second word.

* * * * *